US012742087B2

(12) United States Patent
González Moreno et al.

(10) Patent No.: US 12,742,087 B2
(45) Date of Patent: Sep. 22, 2026

(54) LUMINESCENT INK AND CERAMIC PRODUCT WITH A LABEL PRINTED WITH LUMINESCENT INK

(71) Applicants: ASOCIACIÓN DE INVESTIGACIÓN DE LAS INDUSTRIAS CERÁMICAS (AICE), Castellón de la Plana (ES); COLOROBBIA ESPAÑA, S.A., Vilafamés Castellón (ES)

(72) Inventors: Jorge González Moreno, Castellón de la Plana (ES); Javier García Ten, Castellón de la Plana (ES); Carmen Moreda Beltrán, Castellón de la Plana (ES); Ana María Molina Cuevas, Castellón de la Plana (ES)

(73) Assignees: COLOROBBIA ESPAÑA, S.A., Vilafames-Castellón (ES); ASOCIACIÓN DE INVESTIGACIÓN DE LAS INDUSTRIAS CERAMICAS (AICE), Castellón de la Plana (ES)

( * ) Notice: Subject to any disclaimer, the term of this patent is extended or adjusted under 35 U.S.C. 154(b) by 34 days.

(21) Appl. No.: 18/846,770

(22) PCT Filed: Mar. 15, 2023

(86) PCT No.: PCT/ES2023/070160

§ 371 (c)(1),
(2) Date: Sep. 13, 2024

(87) PCT Pub. No.: WO2023/175224

PCT Pub. Date: Sep. 21, 2023

(65) Prior Publication Data

US 2026/0042925 A1 Feb. 12, 2026

(30) Foreign Application Priority Data

Mar. 14, 2022 (ES) ................................ ES202230208

(51) Int. Cl.
*B32B 3/10* (2006.01)
*B41J 2/175* (2006.01)
(Continued)

(52) U.S. Cl.
CPC ........... *C09D 11/50* (2013.01); *B41J 2/17563* (2013.01); *B41J 2/17596* (2013.01); *B41J 2/18* (2013.01);
(Continued)

(58) Field of Classification Search
None
See application file for complete search history.

(56) References Cited

U.S. PATENT DOCUMENTS 5,478,381 A 12/1995 Ohiwa et al.
2013/0119274 A1* 5/2013 Kane ........................ G07D 7/12 252/301.4 R
2021/0317326 A1* 10/2021 Doherty .................... F21V 9/30

FOREIGN PATENT DOCUMENTS

CN 106147398 A 11/2016
CN 106189517 A 12/2016
(Continued)

OTHER PUBLICATIONS

Kaya et al. "Process parameters determination of phosphorescent pigment added, frit-based wall tiles vetrosa decorations." Ceramics International 38.4 (2012): 2757-2766.
(Continued)

*Primary Examiner* — Christopher M Polley
(74) *Attorney, Agent, or Firm* — McKee, Voorhees & Sease, PLC

(57) ABSTRACT

The present invention relates to a luminescent ink having a composition in % by weight comprising 20-55% of solvent,
(Continued)

5-55% of diluent; 2-15% of dispersant additive; 5-35% of solid particles with fluorescent properties, and 0.5-15% of solid dopant particles. The invention also relates to a process for obtaining a ceramic product with a printed luminescent label which incorporates a step in which digital printing is performed with said luminescent ink, this printing being applied on the surface substrate of the unfired ceramic part; and wherein the printing is performed with a digital printing machine; subjecting the ceramic part to a subsequent heat treatment in a conventional ceramic furnace at a temperature comprised between 650 and 1400° C.; and obtaining a fired ceramic product comprising a luminescent label visible with ultraviolet light. The invention also relates to a ceramic product obtainable by means of said process for obtaining a ceramic product, as well as to the use of the ink for printing luminescent labels that glow under ultraviolet light on ceramic products.

12 Claims, 4 Drawing Sheets

(51) Int. Cl.

| | |
|---|---|
| ***B41J 2/18*** | (2006.01) |
| ***B41J 2/195*** | (2006.01) |
| ***B41J 29/393*** | (2006.01) |
| ***B41M 3/14*** | (2006.01) |
| ***B41M 5/00*** | (2006.01) |
| ***B41M 7/00*** | (2006.01) |
| ***C04B 41/00*** | (2006.01) |
| ***C04B 41/45*** | (2006.01) |
| ***C04B 41/50*** | (2006.01) |
| ***C04B 41/87*** | (2006.01) |
| ***C09D 11/033*** | (2014.01) |
| ***C09D 11/037*** | (2014.01) |
| ***C09D 11/322*** | (2014.01) |
| ***C09D 11/36*** | (2014.01) |
| ***C09D 11/38*** | (2014.01) |
| ***C09D 11/50*** | (2014.01) |
| ***C09K 11/77*** | (2006.01) |

(52) U.S. Cl.

CPC ............. *B41J 2/195* (2013.01); *B41J 29/393* (2013.01); *B41M 3/144* (2013.01); *B41M 5/0047* (2013.01); *B41M 5/007* (2013.01); *B41M 7/009* (2013.01); *C04B 41/0072* (2013.01); *C04B 41/009* (2013.01); *C04B 41/4539* (2013.01); *C04B 41/4572* (2013.01); *C04B 41/5027* (2013.01); *C04B 41/87* (2013.01); *C09D 11/033* (2013.01); *C09D 11/037* (2013.01); *C09D 11/322* (2013.01); *C09D 11/36* (2013.01); *C09D 11/38* (2013.01); *C09K 11/7736* (2013.01); *C09K 11/7794* (2013.01)

(56) References Cited

FOREIGN PATENT DOCUMENTS

| | | | | | |
|---|---|---|---|---|---|
| CN | 107189543 | A | | 9/2017 | |
| CN | 107286936 | A | | 10/2017 | |
| CN | 108249772 | A | | 7/2018 | |
| CN | 109427241 | A | | 3/2019 | |
| CN | 107903065 | B | | 5/2019 | |
| CN | 107739211 | B | | 8/2020 | |
| ES | 2247903 | A1 | | 3/2006 | |
| ES | 2928896 | A1 | | 11/2022 | |
| ES | 2951382 | A1 | | 10/2023 | |
| WO | WO-2004035684 | A2 | * | 4/2004 | ........... C09C 1/0021 |
| WO | WO-2025229130 | A1 | * | 11/2025 | ............. G07D 7/205 |

OTHER PUBLICATIONS

Navami et al. “Design of green emitting CaZrO3: Tb3+ nanophosphor: Luminescence based platform for real-time ultrasensitive detection of latent fingerprints and anti-counterfeiting applications.” Optical Materials 122 (2021): 111474.

Taruta et al. “Preparation and luminescent properties of Eu-doped transparent mica glass-ceramics.” Ceramics International 36.4 (2010): 1303-1309.

Vallés-Pelarda et al. “Up-Converting Lanthanide-Doped YAG Nanospheres.” Frontiers in Materials 7 (2020): 273.

Wu et al. “Flux’s influence on the luminescent properties of europium and dysprosium codoped melilite long afterglow phosphor.” Journal of non-crystalline solids 358.20 (2012): 2734-2740.

* cited by examiner

LUMINESCENT INK AND CERAMIC PRODUCT WITH A LABEL PRINTED WITH LUMINESCENT INK

CROSS REFERENCE TO RELATED APPLICATIONS

This application is a U.S. National Stage application of PCT/ES2023/070160, filed Mar. 15, 2023. The application is herein incorporated by reference in its entirety, including without limitation, the specification, claims, and abstract, as well as any figures, tables, appendices, or drawings thereof.

FIELD OF THE INVENTION

The present invention relates primarily to the definition of the composition of an ink or product which allows obtaining a luminescent label that glows under ultraviolet light conditions, which composition has the particularity of being able to be used on ceramic products such as, for example, a tile; and furthermore the present invention defines a process which defines obtaining the final ceramic product with said printed label, as well as the ceramic product obtainable by means of said process.

This invention is comprised within the different types of compositions for labels, and specifically compositions intended to be used in ceramic products.

The present invention solves the problems of enabling the firing of the ceramic product such that the label remains printed inside the actual product, and the firing process does not affect the luminescent properties of said label. It should be taken into account that, when subjecting an ink composition to high temperatures such as the temperatures required in a ceramic product, this composition losses its photoluminescence characteristics. This advantage is particularly applicable for certifying the authenticity of said ceramic products given that, by obtaining a luminescent label that glows under ultraviolet light conditions, this label is invisible under normal conditions of use.

STATE OF THE ART OF THE INVENTION

As is known to the general public, luminescence is an optical phenomenon that occurs when a material is exposed to a certain light or radiation source which, as a result of the excitation of one or some of the components present, gives rise to the emission of light in the visible spectrum for a certain time period.

The middle of the last century marked the beginning of the development of different alternatives in search of new materials that would provide said optical properties with high guarantees and without exposing human beings and their environment to harmful radiation, like sulfur compounds were known to do. Compounds formed by aluminates of divalent metals (Mg, Ca, Sr, and Ba) were therefore synthesized, whereby it was possible to obtain intense luminescent properties with green light emission characterized by a rapid initial weakening followed by a long-lasting emission at very low intensity. The consideration of incorporating other dopant compounds to the preceding aluminates, such as one or more rare earth metals (Eu, Dy, Nd, Er, Ce, Gd, Sm, Tb, Ho, Pr), allowed improving the emission intensity considerably, as well as obtaining a longer persistence of the developed optical properties.

The luminescent properties of other tetrahedral structured-based compounds which contained silicon in their structural network were discovered at the beginning of this century. These compounds were "disilicates" which, through the inclusion of alkali and alkali earth elements in their three-dimensional structure, enabled the development of luminescent properties with suitable intensity and persistence. Among them, the element which contained magnesium and strontium that was furthermore doped with different rare earth metals ($Sr_2MgSi_2O_7$:$Eu_2$+, $Dy_3$+) stood out, making it an excellent alternative for the development of luminescent properties with more than ten hours of persistence.

Despite the attempts made by different research groups to discover new materials with the desired optical properties, only very few of these materials showed the capacity to exhibit certain luminous properties under certain operating conditions since many of them were highly unstable given their hygroscopic properties.

In this sense, although it is true that active materials made up of sulfites, sulfates, aluminates, and silicates are related to the raw materials used in the ceramic industry, and that these materials can be used in applications typical of these industrial sectors, their use is subject to significant limitations derived both from their synthesis method and from the requirements of the application for which they are intended. Therefore, in the case of sulfur compound-based materials, the high temperatures (900-1250° C.) of the heat treatment carried out in the ceramic manufacturing process entails the loss of their luminescent properties.

In turn, with respect to compounds formed by aluminates, although these structures have a higher physical and chemical stability, their use in the ceramic process greatly complicates their industrial implementation as a result of the (technical, economic, and safety) conditioning factors that must be taken into consideration during their synthesis process, a fact which justifies their limited importance in the ceramic sector.

Moreover, at present, they are many decoration systems which provide surfaces with certain esthetic properties: silkscreen printing, flexographic printing, rotogravure printing, stamping, digital printing. In this sense, the inkjet printing technology has many features that make it interesting for decorating ceramic products.

Despite the advantages described above, in the case of ceramic decoration, there are certain conditioning factors that should be taken into consideration when it comes to ensuring the correct operation of an inkjet system for digital printing (inkjet ink). Some of these factors are imposed by the actual characteristics of the raw materials and/or chemical compounds of various natures which can be used in the formulation of inks and act as precursors of the desired surface effect in the final product; whereas other factors are imposed by the specifications and compositions of the substrate to be decorated, as well as of the manufacturing process itself, such as system productivity, the absence of defects in the decoration, or the compatibility of the technology with the work environment.

In view of the above, the strict requirements that the solid materials used and the ink formulated from these materials must comply with in order to be used in a ceramic product require special mention.

In the case of solid materials, they must be highly refractory, capable of withstanding chemical corrosion of the liquid phases that are formed during the heat treatment step typical of materials of this type (650-1400° C.), allowing the development of suitable fluorescent properties by means of UV light at a wavelength comprised between 360 and 410 nm. Furthermore, these materials must remain completely integrated in the substrate after the firing step, being completely imperceptible to any visual inspection being performed, without reacting or interacting upon any other already existing or subsequent application of the working substrates.

In terms of inks, it should be noted that the quality of the images to be developed strongly depends on the physico-chemical properties of the ink (viscosity, density, particle size, viscoelasticity, and surface tension), on the substrates (their mineralogical composition, surface roughness, and porosity), and on the interaction between both (wettability, stretching, penetration, etc.). Specifically, controlling and optimizing the properties of the ink, such as its viscosity and surface tension, are the most critical aspects of digital printing technology.

Inkjet printing in ceramic product manufacturing is performed today by means of solid particles with a submicron particle size, causing in the case of an unsuitable formulation:

- Clogging of the injectors if the particle sizes are not very well controlled, providing surface defects on the working substrates.
- Instability problems of the developed inks, which entails the agglomeration and sedimentation of the solid particles in the suspension, as well as the alteration of the physical and chemical properties thereof over time.
- Loss of surface effect as a result of the excessive grinding of the raw materials, which furthermore leads to a higher tendency for the particles to agglomerate in the suspension, as well as the blockage of working heads.

The present invention therefore seeks to analyze and solve each and every one of these problems, allowing the development of an ink, and therefore of a printed ceramic product, with a suitable technical, esthetic, and functional performance. In that sense, the formulation requirements or criteria that an ink composition must comply with are as follows:

- Compatibility of the components which are part of the ink with the printing system to be used, preventing the constructive materials making up the system from coming under attack. Degradation of the pumping systems, as well as the entire liquid circulation system, as a result of the use of solvents that are not compatible with the chemical nature of the materials forming the printing system, causes significant problems in the incorporation of the ink in the system.
- Very low evaporation speed, minimizing and preventing the drying of the ink inside the print head, and accordingly the clogging of the injectors. Evaporation of a component present in the ink in the print head causes an increased ink viscosity, as well as a possible separation and even agglomeration of the pigment particles.
- Stability of the ink inside the head, preventing alterations in its physical and chemical properties. The use of dispersant, wetting, suspending additives, etc. allows increasing the stability of the ink, minimizing the problems of clogged print injectors.
- Thermal stability of the ink, preventing its decomposition at the working temperatures of the print head. This decomposition can cause modifications in both physical and chemical properties of the inks, impairing the circulation thereof through the print head.
- Maximum solubility and wetting of the surface effect-bearing particles in the suspension medium making up the ink. The use of components capable of keeping the particles completely integrated in the suspension medium allows increasing the performance of the grinding step, as well as increasing the stability thereof without particle separation problems.
- Wetting capacity of the ink, preventing the ink from drying in the print injectors. The presence of high-polarity functional groups in the ink composition allows the ink to establish hydrogen bonding with water molecules present in the environmental moisture, favoring the wetting of the print head.
- Ease of filtering the ink through small sized holes, favoring the passage therethrough and preventing the abrasion thereof.
- Capacity to withstand the chemical corrosion of the liquid phases generated at high heat treatment temperatures typical of ceramic materials.
- Maintaining the invisibility of the ink deposited on the fired ceramic substrate (visual inspection), providing the fluorescent effect of the printed design after the excitation of the surface thereof with an ultraviolet light source (wavelength comprised in the range of 360-410 nm).

Taking all these preceding aspects into account, in order to develop invisible inks with surface fluorescent properties for authentication on various types of ceramic products, such as ceramic tiles, tableware, sanitary ware, shingles, bricks, and glass, there is a need to solve two essential technical problems:

i. the use of different raw materials which facilitate their incorporation in digital printing systems, ii. the possibility of processing the product at the same time at high temperatures according to a heat treatment step comprised between 650 and 1400° C., and specifically, as in the case of the present invention, the possibility of the producing being visible only under ultraviolet light.

Technologies intended for application on ceramic substrates are known, such as that disclosed in document "Flux's influence on the luminescent properties of europium and dysprosium codoped melilite long afterglow phosphors" of Wu H et al, (*Journal of Non-Crystallite Solids* 358 (2012) 2734-2740), which develops $MgO—SrO—SiO_2$-based ink that does not allow digital printing and is not visible under ultraviolet light.

Document ES2247903A1 discloses a method for manufacturing ceramic parts with photoluminescent effect based on $Al_2O_3$, which allows reaching a firing range of 800-900° C., however, it does not allow digital printing and is not visible under ultraviolet light either.

The document "Process parameters determination of phosphorescent pigment added, frit-based wall tiles vetrosa decorations" of Yesilay S. et al. (*Ceramics International* 38 (2012) 2757-2766), discloses an $Al_2O_3$-based process which can be used for porous ceramic tiles, however, it does not allow digital printing and is not visible under ultraviolet light either.

The document "Preparation and luminescent properties of Eu-doped transparent mica glass-ceramics" of Taruta S et al, (*Ceramics International,* 36(4): 1303-1309), discloses an $Li_2O—MgO—SiO_2—Al_2O_3$-based process which is applicable on porous ceramic tiles, however, it does not allow digital printing and is not visible under ultraviolet light either.

The document "Up-converting Lanthanide-Doped YAG Nanospheres" of Vallés M et al, (*Frontiers in Materials*, August 2020, Volume 7 Article 273) discloses a $Y_2O_3—Al_2O_3$ nanoparticle-based product which can be applied on third-fire ceramic tiles, does not allow digital printing, but has luminescent properties under certain light ranges, ultraviolet light not being among said ranges.

Lastly, the disclosure of document CN106147398A, which is considered the closest prior art, is known and this document discloses a solid tungstate- or molybdate-based material which is added to conventional inkjet inks and can be applied to ceramic tiles, and has luminescent properties under certain light ranges, although not under ultraviolet light. The material is formed by a different composition with a high ceramic pigment content, in which no reducer component having an effect on the luminescent properties is used, and the composition comprises solvents containing C14-C18, n-alkane, isoalkane, cyclic, and <2% aromatic hydrocarbons, having a category I aspiration toxicity classification of H304 which presents certain problems in terms of safety. Furthermore, in order for the final material obtained to be visible, it must be irradiated with IR laser (960 nm) such that the anti-falsification properties will appear. By way of comparison, and pre-empting the detailed description below, the material object of the present invention lacks ceramic pigments, binders, or resins in its composition, whereas these components form between 36 and 70% of the material in document CN106147398A.

Taking all the preceding arguments into account, it is considered necessary to develop a product that allows solving the two problems indicated above, i.e., the possibility of being subjected to digital printing and the possibility of processing the product at the same time at high temperatures according to a heat treatment step comprised between 650 and 1400° C., and the possibility of the product being visible under ultraviolet light, which allows the use thereof for anti-falsification or product authentication purposes.

In view of the background known in the state of the art, the material object of the present invention differs from any other product known in the state of the art and can be processed at high temperatures, like in ceramic raw material firing processes, being capable of providing visually imperceptible luminescent properties, specifically by means of ultraviolet light with a wavelength comprised in the range of 360-410 nm, and adapting its processing to that used in the processing of materials commonly used in ceramic product manufacturing. Furthermore, by means of selecting these raw materials, it is possible to adapt same to the composition of the digital printing inks or inkjet inks intended for the decoration of ceramic products; to facilitate industrial scaling as a result of their commercial availability; to withstand the high temperatures commonly used (650-1400° C.); to generate long-lasting optical properties, maintaining surface imperceptibility by means of digital printing applications.

DESCRIPTION OF THE INVENTION

The first object of the present invention is to define the composition of an ink or product which allows obtaining a luminescent label that glows under ultraviolet light conditions, which composition has the particularity of being able to be used in ceramic products such as, for example, a tile. In order to overcome the aforementioned technical problems, the composition thereof is suitable so that its physical properties, understood as its viscosity, surface tension, density, and viscoelasticity, remain constant in the range of working temperatures during printing, without experiencing any sedimentation, agglomeration, and drying tendency.

Broadly speaking, the composition comprises:

- A solvent, which allows the development of stable inks during the storage step, preventing sedimentation and agglomeration. Furthermore, it has a constant and suitable viscosity that facilitates pumping and metering through the injection system, without causing drying phenomena;
- Special effect-bearing solid particles. The shape of the particles, their size, the degree of dispersion and refractoriness are some of the most important factors which condition the formulation of inks;
- Diluents to adjust the viscosity of the suspensions, which must comply with the same requirements as those demanded of vehicles, where the compatibility thereof with the vehicle is conditioned by the polar-apolar character of both constituents; and
- Additives which, though in a low dose, play a fundamental role in the preparation of the inks, given that they allow conditioning the inks, improving the wetting of the solid, facilitating the dispersion of the particles, and reducing the viscosity and surface tension of the medium.

In more detail, the ink comprises a composition in % (by weight) of:

- 20-55% of solvent, selected from glycols, ethers, esters, aliphatic hydrocarbons, aromatic hydrocarbons, glycol-ether mixtures, glycol-water mixtures, or equivalents, and having the function of being the dispersion medium for the solid particles used in the composition;
- 5-55% of diluent; selected from glycols, ethers, esters, aliphatic hydrocarbons, aromatic hydrocarbons, glycol-ether mixtures, glycol-water mixtures, or the like, and having the function of acting by adjusting the physicochemical properties of the suspensions;
- 2-15% of dispersant; selected from anionic compounds, cationic compounds, non-ionic compounds, short-chain compounds, long-chain compounds, conjugated polymers, having a single bond, a double bond, or the like, having the function of dispersing and/or conditioning the suspensions to facilitate the application thereof in the proposed technology, as well as on the working ceramic substrates;
- 5-35% of solid particles from the combination of at least one component selected from Zr, W, Mo, and V oxides and salts having the function of generating a structure with fluorescent properties; and
- 0.1-15% of solid particles from the combination of at least one component selected from $Eu_2O_3$, $Sm_2O_3$, $Dy_2O_3$, $Nd_2O_3$, $Ho_2O_3$, and $Er_2O_3$; which are particles that act as main dopants to favor electron mobility, being located in the structural gaps of alkali and alkali earth elements, and therefore providing luminescent properties.

Unlike any other ink known in the state of the art, this composition does not have any ceramic pigment, binder, or resin.

Depending on the pressure or atmosphere of the furnace, in a possible embodiment, there is a need to add to the preceding mixture a reducer agent, with there being a total of between 0.01 and 2% of reducer with respect to the mixture; this reducer being selected from silicon carbide, wood shavings, coal, sugar and its derivatives, glues, celluloses, metals, organic solvents, and combinations thereof. This component has the function of being able to consume the oxygen present of the atmosphere surrounding it through its combustion during the ceramic product heat treatment step.

In a possible embodiment of the invention, solid particles which are alkaline oxides can be added, inserted into the grid-like structure of the crystalline matrix formed, and have the function of compensating the electron charge of the network; where there can be between 0.001 and 15% of solid particles in the total mixture, and which alkaline oxides are from the combination of at least one component selected from $Li_2O$, $Na_2O$, and $K_2O$.

In a possible embodiment of the invention, solid co-dopant particles can be added, where there can be between 0.5 and 15% in the total mixture, which solid particles are from the combination of at least one component selected from $CeO_2$, $Y_2O_3$, $La_2O_3$, $Lu_2O_3$, $Gd_2O_3$, $Tb_2O_3$, and $Yb_2O_3$, and particles that act as co-dopant favoring the formation of electron traps, and accordingly improving the generation of luminescent properties.

In a possible embodiment of the invention, wetting additives having the function of preventing the ink from drying in the print head can be added, where there can be between 0.1 and 10% in the total mixture, these additives being at least one selected from pentanediol, glycerin, 1,2-hexanediol, or 1,6-hexanediol.

In a possible embodiment of the invention, the solid particles from the combination of at least one component selected from the Zr, W, Mo, and V oxides and salts, for example, $ZrO_2$, $WO_4^{2-}$, $MoO_4^{2-}$, and $V_2O_7^{2-}$, can form, for example, a crystalline network in the form of perovskite, constituting an ordered short-range structure of the rhombic or orthorhombic type with fluorescent properties. Nevertheless, in other possible embodiments, they may crystalize into other monoclinic, triclinic, tetragonal, cubic, hexagonal, and/or rhombohedral structures or networks also with fluorescent properties.

According to a particular embodiment, the process of manufacturing the ink intended for the development of surface properties for authentication on ceramic substrates starts with the reception and storage of the different raw materials required, whether liquid raw materials (solvents and additives) or solid raw materials (crystalline and/or vitreous raw materials), checking that their physical and chemical properties coincide with the properties considered in the established quality control standards. Having performed the above, the preparation and prior dispersion of the working suspensions then takes place according to the marked loading formulation, carrying out the prior weighing, stirring, and subsequent homogenization of the different components. The resulting mixture is incorporated, by means of a pumping system, into the feed reservoir of the grinder in order to perform the most important and significant step of the manufacturing process: the grinding or particle size reduction step.

Therefore, the grinding of ceramic inkjet inks is mainly characterized by a wet concentrate milling step, since the ink composition is made up of 40-60% by weight of solid components which can include, among them, crystalline materials and/or vitreous materials; with the rest of the formulation being formed by solvents of different chemical natures (paraffins, glycols, esters, glycol-ether, water, and combinations thereof) and additives of different functionalities (viscosity depressants, dispersants, surfactants, antifoaming agents, binders, or others)

The equipment used in the particle size reduction process consists of a continuously-operating high-shear microball grinder and wherein the particle size of the milling elements used is comprised between 0.3 and 0.4 mm. The equipment is intended for achieving a very fine grinding (less than 1 μm) as a result of the high friction existing between the ink and the microballs used which have a high density and high wear resistance. As a result, a large amount of heat is generated during this step, requiring the installation of efficient cooling systems that enable, on one hand, preventing the degradation of the components used in the formulation of the ink, and on the other, utilizing the largest amount of energy for grinding the suspensions prepared (up to 10%), since about 60% of the energy applied in the process is transformed into heat, whereas the remaining 30% is consumed in the form of deformations, vibrations, and wear of the different constructive components.

Once the component mixture has been milled and the particle size and particle size distribution are optimal (<1.5 μm), the formulated ink is conditioned until achieving the desired physical properties of viscosity and density, to then be driven, by means of pumping, to a step of consecutive filtration through different filtering membranes having a pore size of 5 and 2 μm arranged in series. By means of this process, it is possible to remove possible impurities present in the composition of the inkjet ink manufactured as a result of the wear of the milling elements used in the milling step.

The development thus obtained is completely prepared to be stored in corresponding end product reservoirs and to be packaged at any desired time, but not before carrying out quality control on the suspension obtained according to the established manufacturing tolerances (viscosity, density, filterability, and surface effect control). The final size of the ink particles is comprised in a range of between 200 and 1500 nm.

By means of the particular selection of the components comprising the formulation of the inks object of the present invention, it is possible to adapt same to the composition of the inkjet inks intended for the decoration of ceramic products; to facilitate industrial scaling as a result of their commercial availability; to withstand the high temperatures commonly used (650-1400° C.); to generate long-lasting optical properties, maintaining surface imperceptibility by means of inkjet applications; and furthermore to avoid excessive investments and cost-overruns given the possibility of adjusting same to or including same in conventional ceramic product manufacturing processes.

The second object is to define the process which allows obtaining a ceramic product with a printed luminescent label inside its very structure, wherein this process comprises the steps of:

- i) Preparing and obtaining an unfired ceramic part through conventional means, wherein the following steps are followed in the embodiment consisting of a tile:
  - A. preparing and homogenizing the raw materials which form a ceramic paste, these materials being fundamentally clays, feldspars, sand, carbonates, and kaolins, among others;
  - B. milling the different materials of the ceramic paste; comprising at least one of mixing, dispersion, grinding, granulation;
  - C. compacting the milled ceramic paste by uniaxial pressing or isostatic pressing, obtaining a ceramic part formed by the press;
  - D. drying the ceramic part thus obtained (support), wherein the ceramic part is subjected to a temperature of up to 110° C.;
  - E. applying a layer of engobe, glaze, or engobe-glaze by means of immersion, bell, veil, disk, or inkjet, after wetting the ceramic support, wherein this ceramic part has yet to be subjected to firing;
- ii) performing digital printing with luminescent ink such as the one defined above in the form of a label or equivalent decorative element, wherein the composition of the ink allows it to be visible under ultraviolet light, and this printing being applied on the surface substrate of the unfired ceramic part; and wherein the printing is performed with a digital printing machine;

iii) subjecting the ceramic part to heat treatment in a conventional ceramic furnace at a temperature comprised between 650 and 1400° C.; with the temperature depending on the final product to be obtained; and iv) obtaining a fired ceramic product comprising a luminescent label visible with ultraviolet light.

The particularity of the present invention lies in the fact that the digital printing or decorating process prior to heat treatment which allows the printed label or decorative element to have luminescent properties, and furthermore allows these properties to be invisible under normal visualization/inspection conditions, is not known; rather, said decorating or printing step is generally performed once the product is already fired so that the print does not lose its properties, and additives or components which enhance said luminescent capacity are added thereto, and in which this printing is generally often performed directly on the surface substrate that is, however, not part of the actual structure of the ceramic part. Compared to any other type of known technology, the composition of the ink object of the present invention allows performing said printing on the unfired part, given that the composition of the ink withstands the high temperatures of the subsequent heat treatment without losing its properties, and wherein the printed decorative label or sign is part of the actual structure of the final ceramic part, and this along with the fact that the composition is visible under ultraviolet light, allows the possibility of using same for purposes such as the authentication or anti-falsification of the products themselves.

The digital printing machine required for the essential printing step is a machine comprising at least one ink reservoir in which the ink described above in the preceding sections is arranged; wherein each ink reservoir is connected with a head which prints on the surface substrate of the unfired ceramic part. At the outlet of the ink storage reservoir there is a pump that pumps the material to the head, with a filter being arranged at the outlet of the pump to ensure the particle size, a conduit connecting the filter with the head, comprising a recirculation circuit in the case of pumping more material that is to be printed, and a thermostat which regulates the temperature of the raw material can also be arranged before the head, all of them being managed by a programmable control module of the machine in which the label to be printed is designed and the parameters for printing the ink on the substrate of the unfired ceramic part are managed.

Within the essential digital printing decorating step, as indicated, the ink has a composition as set forth above, and two sub-steps can in turn be established in said printing step:

a) preparing the raw materials of the ink for their incorporation in a digital printer, wherein the following are required:
   i. storing the different raw materials;
   ii. weighing and selecting the amount of each component according to the formulation;
   iii. performing preparation and prior dispersion;
   iv. grinding and cooling the grinder;
   v. filtering the components at 10, 5, or 2 μm for subsequent printing by means of print heads;
   vi. performing quality control of the milled and filtered ink;
   vii. storing or packaging the milled and filtered product to be used when required;

b) printing the ink in the digital printer on the surface substrate of the unfired ceramic part, wherein the following are required:
   i. stirring the inks inside the storage reservoirs for a time comprised between 1 and 24 hours:
   ii. adapting the internal temperature of the ink comprised in the storage reservoirs to a temperature comprised between 25 and 50° C.;
   iii. pumping the ink at a pressure difference in the system of between (−5) and (−250) mbar;
   iv. filtering the material at a pore size of 5 μm;
   v. printing by means of the heads with:
      a. a print speed comprised between 5 and 90 m/min;
      b. a print resolution comprised between 25 and 400 dpi;
      c. a droplet volume comprised between 6 and 200 pl
      d. a deposition weight of between 5 and 150 g/m$^2$
      e. a firing frequency of between 1 and 20 KHz
      f. an ink viscosity of the ink of between 8 and 25 mPa·s
      g. an ink density of between 1 and 1.50 c/m$^3$;
      h. an electrical conductivity of between 0.0 and 0.4 μS/cm
      i. a surface tension of between 25 and 50 mN/m; and
      j. an ink temperature in the head of between 25 and 50° C.

In this sense, the final ceramic product obtained which comprises a luminescent label as a result of the ink visible with ultraviolet light is highly versatile since it can be adapted to a wide range of ceramic substrates, chemical compositions, and heat treatment temperatures, without experiencing undesired surface changes, offering high performance of fluorescent and invisible properties, and without modifying the coloration of the rest of inkjet inks applied. Furthermore, the printing of the product has the advantage of not requiring first cleaning the part or carrying out any type of prior treatment thereof, nor does it require performing any surface drying process, since the consolidation of the product on the substrate, prior to its firing, occurs through processes of absorption and embedment within the porosity of the crude working support.

Another object of the present invention is a ceramic product with a printed luminescent label obtainable by means of the described process for obtaining a ceramic product.

Another object of the present invention is to define the use of an ink according to the features indicated above for printing luminescent labels that glow under ultraviolet light on ceramic products. Label should be understood to mean a decoration, where it can be a QR code, a barcode, a stamp which allows tracking the product, a fingerprint, an image, or any other printed representation which can be considered similar or equivalent.

Lastly, ceramic product should be understood to mean any product having a composition or structure based on a ceramic paste which comprises clay, silica, and feldspar in its composition, this ceramic paste subsequently being subjected to heat treatment until obtaining the ceramic product, wherein this ceramic product can be, by way of non-limiting example, a tile, tableware; a porcelain part, wherein the porcelain may or may not be sanitary porcelain; a piece of earthenware, wherein the piece of earthenware may or may not be sanitary earthenware; or even construction elements such as a brick or shingle.

It should be taken into account that throughout the description and claims, the term "comprises" and variants thereof do not seek to exclude other additional technical features or elements.

BRIEF DESCRIPTION OF THE FIGURES

In order to complete the description and to help better understand the features of the invention, a set of figures and drawings in which the following is depicted in a non-limiting illustrative manner is provided.

DETAILED DESCRIPTION OF EMBODIMENTS OF THE INVENTION

Figure 1:
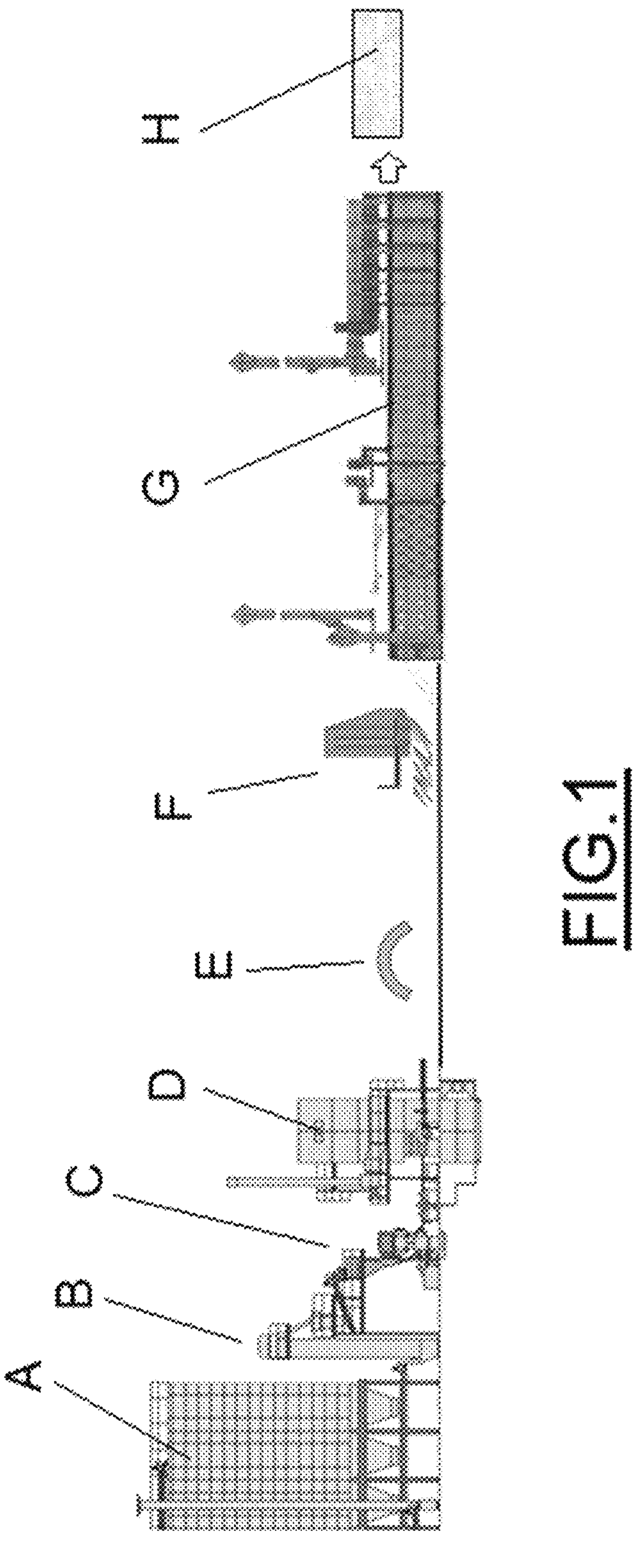
FIG. 1 schematically shows the different steps for producing a ceramic part comprising a luminescent label that glows under ultraviolet light.

Different embodiments of the inks such as those described above and in which all the possible components are included, not only the essential components, are described in detail below.

Tables 1 to 3 show, respectively, the relationship existing between each of the selected components and the formulated inks with respect to the constant solid content, as well as the grinding conditions used in the particle size reduction step.

TABLE 1

| | Fluorescent host | | Alkaline oxides | | Main dopants | | Co-dopants | | Reducer | |
|---|---|---|---|---|---|---|---|---|---|---|
| Ink | Type | % | Type | % | Type | % | Type | % | Type | % |
| A | $V_2O_7^{2-}$ | 93 | — | — | $Eu_2O_3$ | 7 | — | — | — | — |
| B | $WO_4^{2-}$ | 89.8 | $K_2O$ | 3.78 | $Eu_2O_3/Sm_2O_3$ (0.8/0.2) | 6.4 | — | — | Shaving | 0.02 |
| C | $MoO_4^{2-}$ | 89.2 | $K_2O$ | 3.55 | $Eu_2O_3/Sm_2O_3$ (0.5/0.5) | 7.2 | — | — | Sugar | 0.05 |
| D | $MoO_4^{2-}$ | 89.6 | $Na_2O$ | 3.59 | $Eu_2O_3/Sm_2O_3$ (0.8/0.2) | 4.6 | $Y_2O_3$ | 2.2 | Glucose | 0.01 |
| E | $V_2O_7^{2-}$ | 89.0 | $Na_2O$ | 3.89 | $Eu_2O_3/Ho_2O_3$ (0.9/0.1) | 4.7 | $Tb_2O_3$ | 2.4 | Coal | 0.01 |
| F | $MoO_4^{2-}$ | 89.1 | $K_2O$ | 3.17 | $Eu_2O_3/Er_2O_3$ (0.9/0.1) | 6.8 | $Yb_2O_3$ | 0.9 | Glucose | 0.03 |
| G | $WO_4^{2-}$ | 89.1 | $K_2O$ | 4.38 | $Eu_2O_3/Sm_2O_3$ (0.5/0.5) | 5.2 | $Gd_2O_3$ | 1.3 | CSi | 0.02 |
| H | $V_2O_7^{2-}$ | 89.2 | $Na_2O$ | 3.9 | $Eu_2O_3/Dy_2O_3$ (0.8/0.2) | 5.8 | $Lu_2O_3$ | 1.1 | — | — |
| I | $WO_4^{2-}/MoO_4^{2-}$ (1/1) | 89.1 | LizO | 3.68 | $Eu_2O_3/Sm_2O_3$ (0.8/0.2) | 5.5 | $Y_2O_3$ | 1.6 | CSi | 0.02 |
| J | $WO_4^{2-}/MoO_4^{2-}$ (1/1) | 86.5 | $Na_2O$ | 1.59 | $Eu_2O_3$ | 4 | $Y_2O_3$ | 7.9 | Coal | 0.01 |

Table 1 shows the solid components used in the inks with surface fluorescent properties.

TABLE 2

| Ink | Grinding solvent | Diluents | Dispersant | Other additives |
|---|---|---|---|---|
| A | Ethyl cocoate | 2-ethylhexanol palmitate | Polymeric hyperdispersants with a single bond | — |
| B | Tripropylene glycol methyl ether | Dipropylene glycol | Polymeric hyperdispersants with a single bond | 1,2-hexanediol |
| C | Tripropylene glycol methyl ether | 2-ethylhexanol palmitate | Polymeric hyperdispersants with a single bond | — |
| D | Dioctyl adipate | Dioctyl adipate | Polymeric hyperdispersants with a single bond | — |
| E | Isotridecyl stearate | Ethyl cocoate | Polymeric hyperdispersants with a single bond | — |
| F | 2-ethylhexanol palmitate | Ethyl cocoate | Polymeric hyperdispersants with a single bond | — |
| G | 2-ethylhexanol stearate | Dioctyl adipate | Polymeric hyperdispersants with a single bond | — |
| H | Mixture of isobutyl esters | 2-ethylhexanol palmitate | Polymeric hyperdispersants with a single bond | — |
| I | Dioctyl adipate | Mixture of isobutyl esters | Polymeric hyperdispersants with a single bond | — |

TABLE 2-continued

| Ink | Grinding solvent | Diluents | Dispersant | Other additives |
| --- | --- | --- | --- | --- |
| J | Ethyl cocoate | 2-ethylhexanol palmitate | Polymeric hyperdispersants with a single bond | — |

Table 2 shows the liquid components used in the inks with surface fluorescent properties.

TABLE 3

| Ink | CS (wt)% | Solvent (wt)% | Diluent (wt)% | Dispersant (wt)% | KWh/kg of solid |
| --- | --- | --- | --- | --- | --- |
| A | 44.200 | 35.002 | 15.000 | 5.750 | 0.85 |
| B | 44.100 | 40.197 | 10.000 | 5.730 | 0.87 |
| C | 44.000 | 31.575 | 20.000 | 4.402 | 0.89 |
| D | 44.000 | 31.575 | 20.000 | 4.402 | 0.90 |
| E | 44.000 | 37.219 | 10.000 | 8.797 | 0.88 |
| F | 44.000 | 38.703 | 12.000 | 5.282 | 0.97 |
| G | 44.000 | 35.703 | 15.000 | 5.282 | 1.02 |
| H | 44.000 | 40.703 | 10.000 | 5.282 | 1.00 |
| I | 44.000 | 40.703 | 10.000 | 5.282 | 1.08 |
| J | 44.000 | 40.703 | 10.000 | 5.282 | 1.08 |

Table 3 shows the compositions and grinding conditions of the inks formulated and developed with the ratio by weight (wt) %.

Table 4 below shows the results of the physical properties of the different formulated inks.

prised between 650 and 1400° C.; with the temperature depending on the final product to be obtained; and iv) obtaining a fired ceramic product comprising a luminescent label visible with ultraviolet light.

In a possible embodiment of the invention, the process for the specific case of obtaining a tile with said luminescent label is defined. This process can be schematically seen in FIG. 1 with references (A)-(H) that correspond with the different steps of the process, wherein the process precisely comprises the steps of:

(A) preparing and homogenizing the raw materials which form a ceramic paste, these materials being fundamentally clays, feldspars, sand, carbonates, and kaolins, among others;

(B) milling the different materials of the ceramic paste; comprising at least one of mixing, dispersion, grinding, granulation;

(C) compacting the milled ceramic paste by uniaxial pressing or isostatic pressing, obtaining a ceramic part formed by the press;

(D) drying the ceramic part or support thus obtained, wherein the ceramic part is subjected to a temperature of up to 110° C.;

(E) applying, after crushing the support, engobe, glaze, or engobe-glaze, wherein this ceramic part has yet to be subjected to firing;

(F) performing digital printing with luminescent ink such as the one defined above in the form of a label, wherein the composition of the ink allows it to be visible under

TABLE 4

| Ink | Particle size distribution (μm) $D_{10}$ | $D_{50}$ | $D_{90}$ | $D_{100}$ | Viscosity at 45° C. (mPa · s) 12 rpm | 20 rpm | Sedimentation at 45° C. (%) | Agglomeration at 45° C. (%) | Density at 25° C. (g/cm³) | Dynamic surface tension 45° C. (mN/m) 10 ms |
| --- | --- | --- | --- | --- | --- | --- | --- | --- | --- | --- |
| A | 0.345 | 0.638 | 0.981 | 1.451 | 18.70 | 18.81 | 10.60 | 1.80 | 1.280 | 33.2 |
| B | 0.347 | 0.677 | 0.947 | 1.425 | 20.90 | 20.06 | 5.80 | 2.00 | 1.280 | 33.1 |
| C | 0.347 | 0.715 | 0.995 | 1.389 | 23.40 | 23.58 | 4.40 | 1.55 | 1.280 | 32.9 |
| D | 0.342 | 0.720 | 0.985 | 1.397 | 18.25 | 18.45 | 12.90 | 1.30 | 1.280 | 33.5 |
| E | 0.346 | 0.701 | 0.895 | 1.256 | 19.50 | 19.56 | 10.55 | 1.25 | 1.280 | 33.5 |
| F | 0.345 | 0.687 | 0.901 | 1.155 | 21.50 | 21.63 | 10.00 | 2.00 | 1.280 | 33.1 |
| G | 0.374 | 0.485 | 0.588 | 0.608 | 22.15 | 21.81 | 8.20 | 0.60 | 1.280 | 35.2 |
| H | 0.372 | 0.388 | 0.397 | 0.403 | 25.45 | 24.33 | 8.10 | 0.40 | 1.280 | 34.4 |
| I | 0.373 | 0.589 | 0955 | 1.209 | 26.25 | 25.02 | 7.85 | 1.20 | 1.280 | 35.9 |
| J | 0.347 | 0.482 | 0.592 | 0.609 | 23.20 | 22.83 | 4.00 | 0.60 | 1.280 | 33.8 |

After obtaining any of those possible embodiments of an ink that is visible under ultraviolet light (inks A-J), the second object is to define the process which allows obtaining a ceramic product with a printed luminescent label inside its very structure, wherein this process comprises the steps of:

i) Preparing and obtaining an unfired ceramic part through conventional means, obtaining an unfired support or ceramic part;

ii) performing digital printing with luminescent ink such as the one defined above in the form of a label or equivalent decorative element, wherein the composition of the ink allows it to be visible under ultraviolet light, and this printing being applied on the surface substrate of the unfired ceramic part; and wherein the printing is performed with a digital printing machine;

iii) subjecting the ceramic part to heat treatment in a conventional ceramic furnace at a temperature comultraviolet light, and this printing being applied on the surface substrate of the unfired ceramic part; and wherein the printing is performed with a digital printing machine.

(G) subjecting the ceramic part to heat treatment in a conventional ceramic furnace at a temperature between 900 and 1250° C.; and (H) obtaining a fired ceramic product comprising a luminescent label visible with ultraviolet light, in the case of this possible embodiment, a tile.

Figure 2:
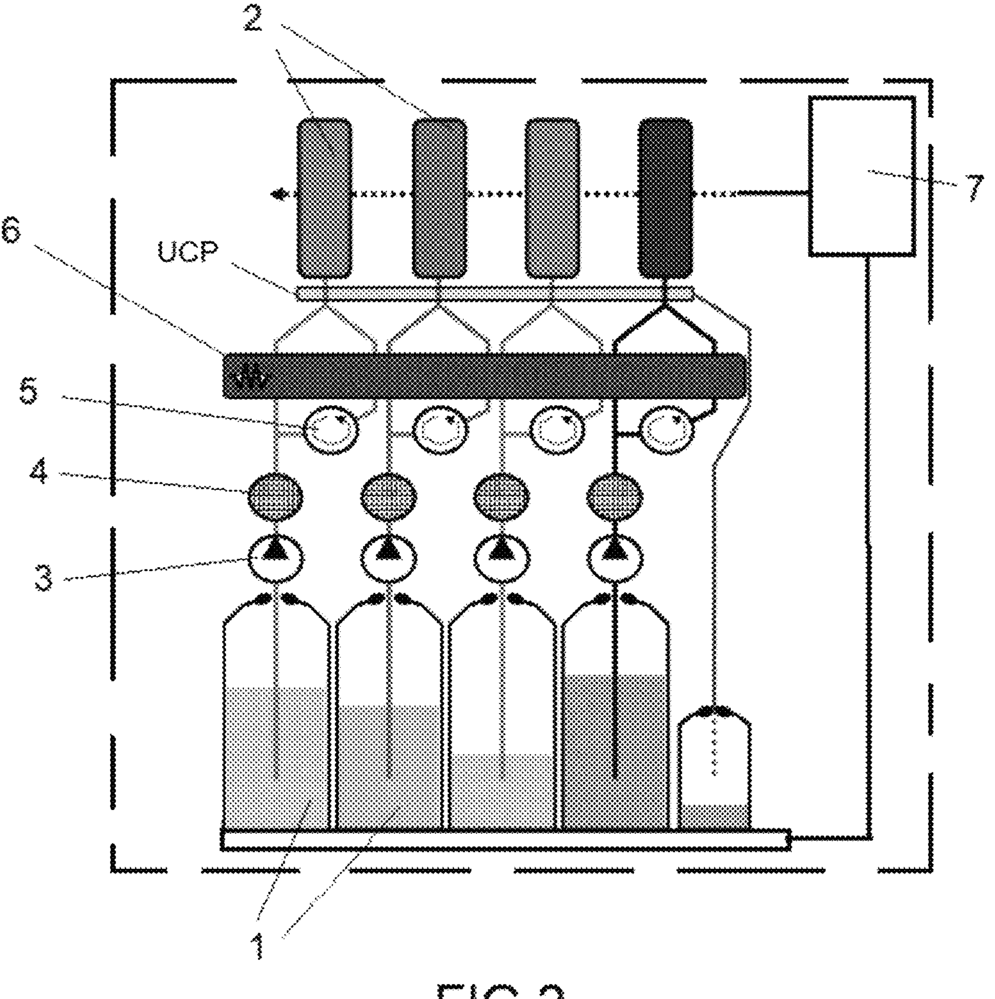
FIG. 2 schematically shows how a luminescent ink digital printing machine is formed internally and the printing of said ink on the surface substrate of the unfired ceramic part.

To improve the description, FIG. 2 schematically shows how the digital printing machine is, as indicated above the machine comprises, in a possible embodiment of the invention, ink storage reservoirs (1) in which the ink described above in the preceding sections is arranged; wherein each storage reservoir (1) is connected with a head (2) which is the device that prints on the surface substrate of the unfired ceramic part (UCP). At the outlet of the ink storage reservoir there is a pump (3) that pumps the material to the head, with a filter (4) being arranged at the outlet of the pump to ensure the particle size, a conduit connecting the filter with the head, comprising a recirculation circuit (5) in the case of pumping more material that is to be printed, and a thermostat (6) which regulates the temperature of the raw material can also be arranged before the head, all of them being managed by a programmable control module (7) of the machine in which the label to be printed is designed and the parameters for printing the ink on the substrate of the unfired ceramic part are managed.

Figure 3A:
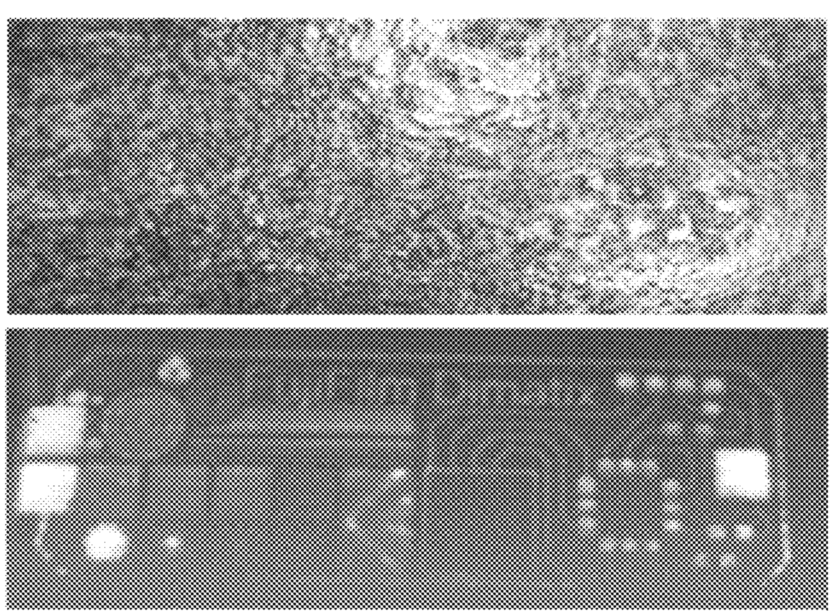
FIGS. 3A-3D show the different results from printing a possible embodiment of the ink on tiles and their corresponding labels which are visible under ultraviolet light.

By way of example, FIG. 3A shows a luminescent label developed according to the example of ink A (Tables 1 to 4) at the firing temperature of 1220° C. and a weight of 12 $g/m^2$. The image on top shows the inspection of a tile by means of (excitation-free) daylight; whereas the image at the bottom shows an authenticity-certifying label which is visible by means of visual inspection with UV light at a wavelength of 360-380 nm.

Figure 3B:
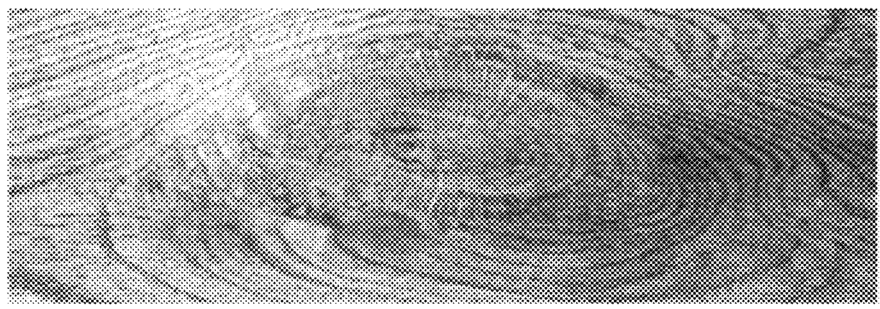
Figure 3B:
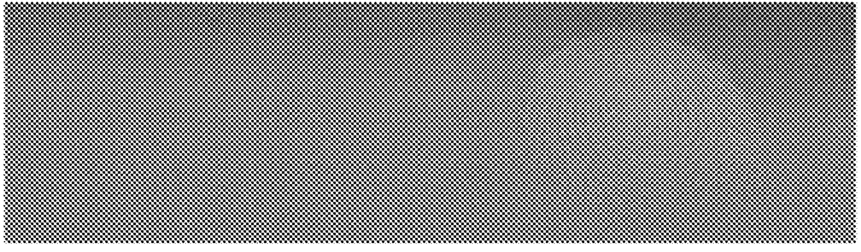

FIG. 3B shows a luminescent label developed according to the example of ink B (Tables 1 to 4) at the firing temperature of 1200° C. and with a weight of 10 $g/m^2$. The image on top shows the inspection of a tile by means of (excitation-free) daylight; whereas the image at the bottom shows an authenticity-certifying label in the form of a fingerprint which is visible by means of visual inspection with UV light at a wavelength of 360-380 nm.

Figure 3C:
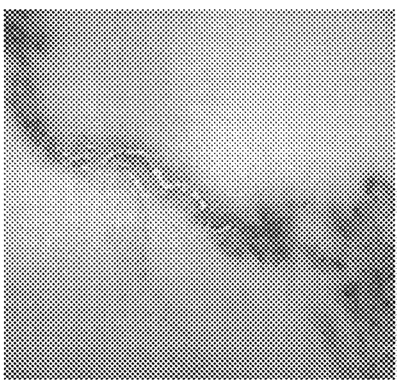
Figure 3C:
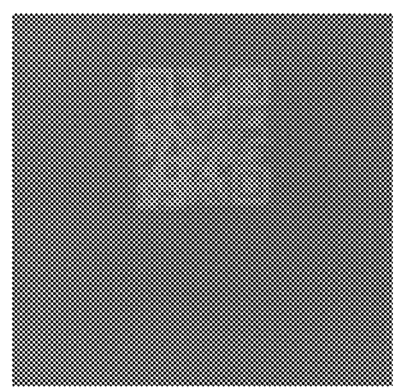

FIG. 3C shows a luminescent label developed according to the example of ink I (Tables 1 to 4) at the firing temperature of 1150° C. and with a weight of 12 $g/m^2$. The image on top shows the inspection of a tile by means of (excitation-free) daylight; whereas the image at the bottom shows an authenticity-certifying label in the form of a QR code which is visible by means of visual inspection with UV light at a wavelength of 360-380 nm.

Figure 3D:
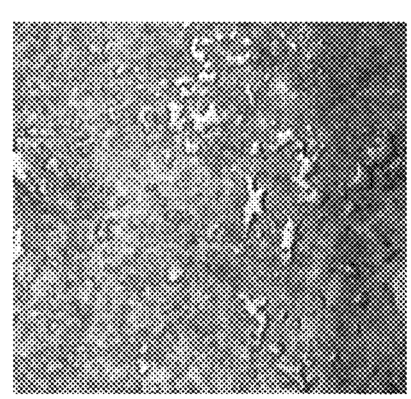
Figure 3D:
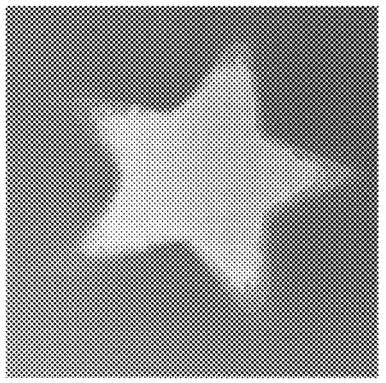

FIG. 3D shows a luminescent label developed according to the example of ink J (Tables 1 to 4) at the firing temperature of 1120° C. and with a weight of 10 $g/m^2$. The image on top shows the inspection of a tile by means of (excitation-free) daylight; whereas the image at the bottom shows an authenticity-certifying label in the shape of a star which is visible by means of visual inspection with UV light at a wavelength of 360-380 nm.

Taking all the preceding aspects into account, the present invention solves the problems of enabling the firing of ceramic product such that a luminescent label is printed inside the actual product, and such that the firing process does not affect the luminescent properties of said label. As indicated throughout the description, this allows obtaining a special advantage or application intended for the field of certifying the authenticity of said ceramic products given that, by obtaining a luminescent label that glows under ultraviolet light conditions, this label is invisible under normal conditions of use (FIGS.—A-3D).

The invention claimed is:

1. A luminescent ink which has a composition in % by weight comprising:

20-55% of solvent; being at least one selected from glycols, ethers, esters, aliphatic hydrocarbons, aromatic hydrocarbons, glycol-ether mixtures, or glycol-water mixtures;

5-55% of diluent; being at least one selected from glycols, ethers, esters, aliphatic hydrocarbons, aromatic hydrocarbons, glycol-ether mixtures, glycol-water mixtures;

2-15% of dispersant; being at least one selected from anionic compounds, cationic compounds, non-ionic compounds, short-chain compounds, long-chain compounds, conjugated polymers having a single bond or a double bond;

5-35% of solid particles from the combination of at least one component selected from Zr, W, Mo, and V oxides and salts with fluorescent properties; and 0.1-15% of solid dopant particles from the combination of at least one component selected from $Eu_2O_3$, $Sm_2O_3$, $Dy_2O_3$, $Nd_2O_3$, $Ho_2O_3$, and $Er_2O_3$.

2. The luminescent ink according to claim 1, wherein at least one reducer agent is added, with there being between 0.01 and 2% of reducer in the total mixture, and this reducer being at least one selected from silicon carbide, wood shavings, coal, sugar and its derivatives, glues, celluloses, metals, or organic solvents.

3. The luminescent ink according to claim 1, wherein solid particles which are alkaline oxides are added, with there being between 0.001 and 15% of solid particles in the total mixture, and which alkaline oxides are from the combination of at least one component selected from $Li_2O$, $Na_2O$, and $K_2O$.

4. The luminescent ink according to claim 1, wherein solid co-dopant particles are added, with there being between 0.5 and 15% of solid co-dopant particles in the total mixture, and which particles are from the combination of at least one component selected from $CeO_2$, $Y_2O_3$, $La_2O_3$, $Lu_2O_3$, $Gd_2O_3$, $Tb_2O_3$, and $Yb_2O_3$.

5. The luminescent ink according to claim 1, wherein wetting additives are added, with there being between 0.1 and 10% of wetting additives in the total mixture; this wetting additive being at least one selected from 1,2-hexanediol or 1,6-hexanediol, pentanediol, or glycerin.

6. A process for obtaining a ceramic product with a printed luminescent label, wherein the label is printed inside the actual structure of the ceramic product, the process comprising the following steps:

i) preparing and obtaining an unfired ceramic part, obtaining an unfired support or ceramic part;

ii) performing digital printing with luminescent ink according to the features of claim 1, this printing being applied on the surface substrate of the unfired ceramic part; and wherein the printing is performed with a digital printing machine;

iii) subjecting the ceramic part to heat treatment in a conventional ceramic furnace at a temperature comprised between 65° and 1400° C.; and iv) obtaining a fired ceramic product comprising a luminescent label visible with ultraviolet light.

7. The process for obtaining a ceramic product with a printed luminescent label according to claim 6, wherein step (ii) of performing digital printing comprises a sub-step of preparing the raw materials of the ink in a digital printer; and a sub-step of printing the ink in the digital printer on the surface substrate of the unfired ceramic part.

8. The process for obtaining a ceramic product with a printed luminescent label according to claim 6, wherein the digital printing machine comprises at least one ink storage reservoir in which the raw material of the ink is arranged; wherein each storage reservoir is connected with a conduit with a head that prints the ink on the surface substrate of the unfired ceramic part, with the design and the printing being managed by a programmable control module of the machine.

9. The process for obtaining a ceramic product with a printed luminescent label according to claim 8, wherein at the outlet of the ink storage reservoir there is a pump that pumps the material to the head, with a filter being arranged at the outlet of the pump.

10. The process for obtaining a ceramic product with a printed luminescent label according to claim 9, wherein the conduit connecting the filter with the head comprises a recirculation circuit for excess material to be printed located between the filter and the head.

11. The process for obtaining a ceramic product with a printed luminescent label according to claim 9, wherein the conduit connecting the filter with the head comprises a thermostat located between the filter and the head.

12. A ceramic product with a printed luminescent label obtainable by means of the process for obtaining a ceramic product described in claim 6.

* * * * *